United States Patent [19]

Morishita

[11] Patent Number: 4,866,733
[45] Date of Patent: Sep. 12, 1989

[54] RADIO BUS SYSTEM

[75] Inventor: Masanobu Morishita, Osaka, Japan

[73] Assignee: NEC Home Electronics Ltd., Osaka, Japan

[21] Appl. No.: 99,006

[22] Filed: Sep. 21, 1987

[30] Foreign Application Priority Data

Oct. 31, 1986 [JP] Japan ................. 61-258124

[51] Int. Cl.$^4$ ............................................. H04L 27/30
[52] U.S. Cl. ...................................................... 375/1
[58] Field of Search ................ 455/88, 57, 70, 140; 375/8, 1; 380/34

[56] References Cited

U.S. PATENT DOCUMENTS

| | | | |
|---|---|---|---|
| 4,351,064 | 9/1982 | Ewanus | 375/1 |
| 4,438,519 | 3/1984 | Bose | 375/1 |
| 4,475,208 | 10/1984 | Ricketts | 375/1 |
| 4,481,640 | 11/1984 | Chow et al. | 375/1 |
| 4,567,588 | 1/1986 | Jerrim | 375/1 |
| 4,641,322 | 2/1987 | Hasegawa | 375/1 |
| 4,724,435 | 2/1988 | Moses et al. | 375/1 |
| 4,761,796 | 8/1988 | Dunn et al. | 375/1 |
| 4,804,938 | 2/1989 | Rouse et al. | 375/1 |

Primary Examiner—Salvatore Cangialosi
Attorney, Agent, or Firm—Cushman, Darby & Cushman

[57] ABSTRACT

A radio bus system formed by combining a spread spectrum (SS) communication radio bus system with an electrical power line bus system using a spread spectrum modulated signal of the same signal format as that used in the radio bus system. An information signal transmission system is formed which transmits an information signal between a controller and a device which may or may not be connected to the electrical power line bus system, the information signal to be transmitted being converted into a spread spectrum modulated signal by an SS modem on a transmitter side and being succeedingly converted into a radio signal in a radio transmitter part of the transceiver section on the transmitter side for radiating the radio signal. The received radio signal is then converted on the receiver side into a spread spectrum modulated signal in a radio receiver part of the transceiver section and converted into the information signal by the SS modem on the receiver side for transmission through the electrical power line.

6 Claims, 3 Drawing Sheets

RADIO BUS SYSTEM

BACKGROUND OF THE INVENTION

1. Field of the Invention

The present invention relates to a radio bus system for signal transmission over airwaves, and more particularly, to a system using spread spectrum according to a PN series (pseudorandom-number series) in an enlarged radio bus system formed by combining a radio bus system with an existing electrical line bus system. A spread spectrum signal is superposed on an electrical line bus by using an identical signal format for the spread spectrum modulated signal for each system. The term "radio" as here defined means broadly a transmission using an electromagnetic wave, including a light wave.

2. Description of the Prior Art

For controlling a great number of devices in remote locations it is not only uneconomical to connect a controller to each of the individual devices through wires, but it is also often impracticable to stretch such wires indoors. Therefore, a system for transmitting a control signal through existing electrical power lines as a home bus has been proposed in the prior art. For use in such a system, a spread spectrum (SS) communication method has already been proposed (Japanese Patent Application No. 017359/1984 and Japanese Patent Unexamined Publication No. 1613996/1985).

However, since the original object of a house's electrical line is to supply commercial electric power, there is no consideration in such systems for high-frequency transmission characteristics. Further, since various kinds of electric power appliances are connected to these lines, the characteristics of the lines vary according to the load, which may cause poor transmission. Also, noises produced from those appliances which are connected to the lines adversely affect signal transmission. Moreover, if the energy of a signal is increased in an effort to overcome noise, the increase of signal energy may adversely influence the various kinds of appliances which may be connected to the lines.

A bus system for an SS communication system of the prior art is generally shown in FIG. 1. A controller 5 and devices 6 and 7 and the like which communicate over the SS communication system are connected to an electrical line 1 through AC outlets 2(1), 2(2), 2(3) and so forth. The allocation of the controller and devices is arbitrary. For example, the number of controllers may be more than one. Also, the controller need not always be provided separately from the devices; it may be directly connected to the device. The communication equipment (inclusive of the controller and the devices) thus configured can transmit signals to and from one another through coupler circuits 3(1), 3(2), 3(3) and the like, and spread spectrum modems (hereinafter abbreviated as "SS modems") 4(1), 4(2), 4(3) and the like can be used in the SS communication system with electrical line 1 as a signal bus.

This bus system of the prior art is useful as a transmission system between different pieces of communication equipment connected to the electrical line. However, due to the nature of the system, it is necessary that each piece of equipment be fixed to the electrical line. Accordingly, such a transmission system is inconvenient. If such equipment could be remotely controlled by a portable apparatus apart from the electrical line, or, in other words, if a radio bus system could be formed, the transmission system would be much more useful.

SUMMARY OF THE INVENTION

Accordingly, the present invention is designed to control equipment remotely and comprises a portable apparatus which is one constituent member of a radio bus system. The apparatus of the present invention is used as a subcontroller connected to the SS communication line bus system through a radio transmission line so that the aforementioned equipment in the electrical line bus system may be directly or indirectly controlled through the electrical line bus system controller as instructed by the subcontroller. Thus, the present invention provides an enlarged radio bus system formed by combining an SS communication radio bus system with an electrical line bus system which uses a spread spectrum modulated signal of the same signal format as that used in the radio bus system.

According to the present invention, a radio bus system in which signal transmission is performed through a radio transmission line between a controller and at least one device having a transceiver section for communicating with the controller by radio is improved by including for the controller and each device a spread spectrum modem (SS modem). The system so configured makes up an information signal transmission system such that an information signal to be transmitted between the controller and a device connected to the electrical line is converted into a spread spectrum modulated signal by the SS modem and succeedingly converted into a radio signal in a radio transmitter part of the transceiver section. The received radio signal is then converted into the spread spectrum modulated signal in a radio receiver part of the transceiver section and succeedingly converted into the information signal by the SS modem.

A radio bus system in accordance with another embodiment of the present invention may be combined with a spread spectrum electrical line bus system having the same format for the spread spectrum modulated signal as that of the radio bus system. That is, in the radio bus system, at least one of the devices having a transceiver section for communicating with the controller by radio may be formed as a transmission-reception adapter having a radio transceiver section and a coupler circuit coupled to the electrical line bus, the spread spectrum signal received by the radio receiver part of the radio transceiver section being transmitted onto the electrical line bus through the coupler circuit on the one hand, and the spread spectrum signal received from the electrical line bus through the coupler circuit being converted into a radio signal in a radio transmitter part of the transceiver section on the other hand. In this manner, the beneficial features of the radio bus system and the spread spectrum electrical line bus system may be combined for two-way communication.

In addition, in the radio bus system in accordance with the present invention, the controller can be portable for controlling other equipment from an arbitrary place. Also, in the SS communication system, synchronization and signal modulation/demodulation are performed according to a common synchronization PN series and an individually allocated PN series so that the equipment in the radio bus system can be easily controlled selectively. Thus, even if the system is set up at a place with bad transmission conditions or at a place where the equipment is often hampered by external noises, sufficiently reliable signal transmission can be achieved.

DETAILED DESCRIPTION OF THE PREFERRED EMBODIMENTS

Figure 1:
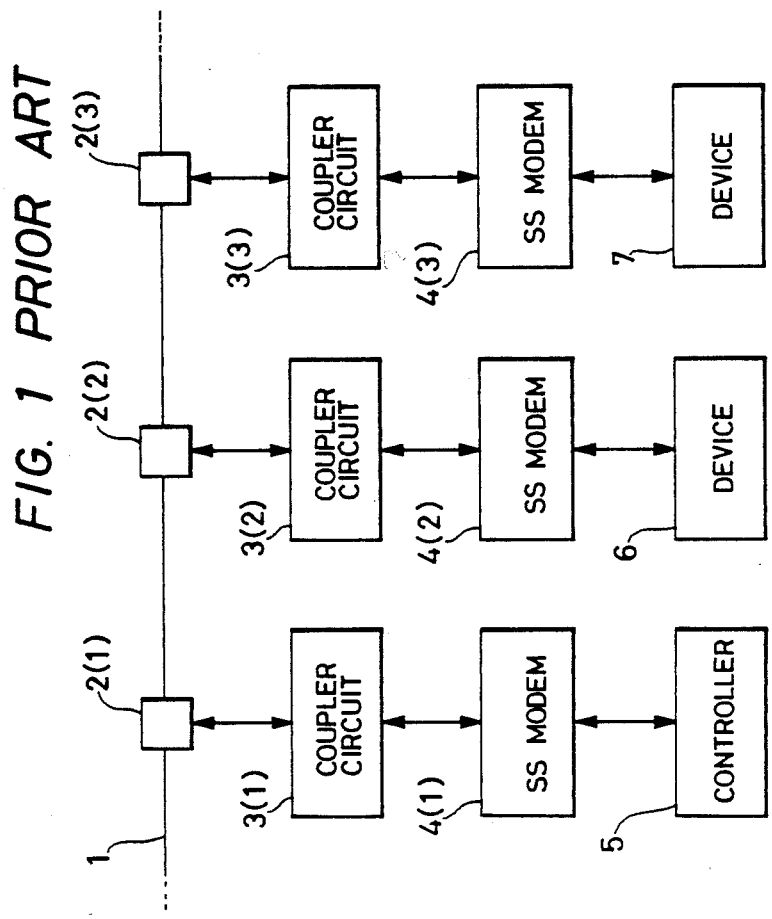
FIG. 1 is a system diagram of a conventional electrical line bus.
Figure 2:
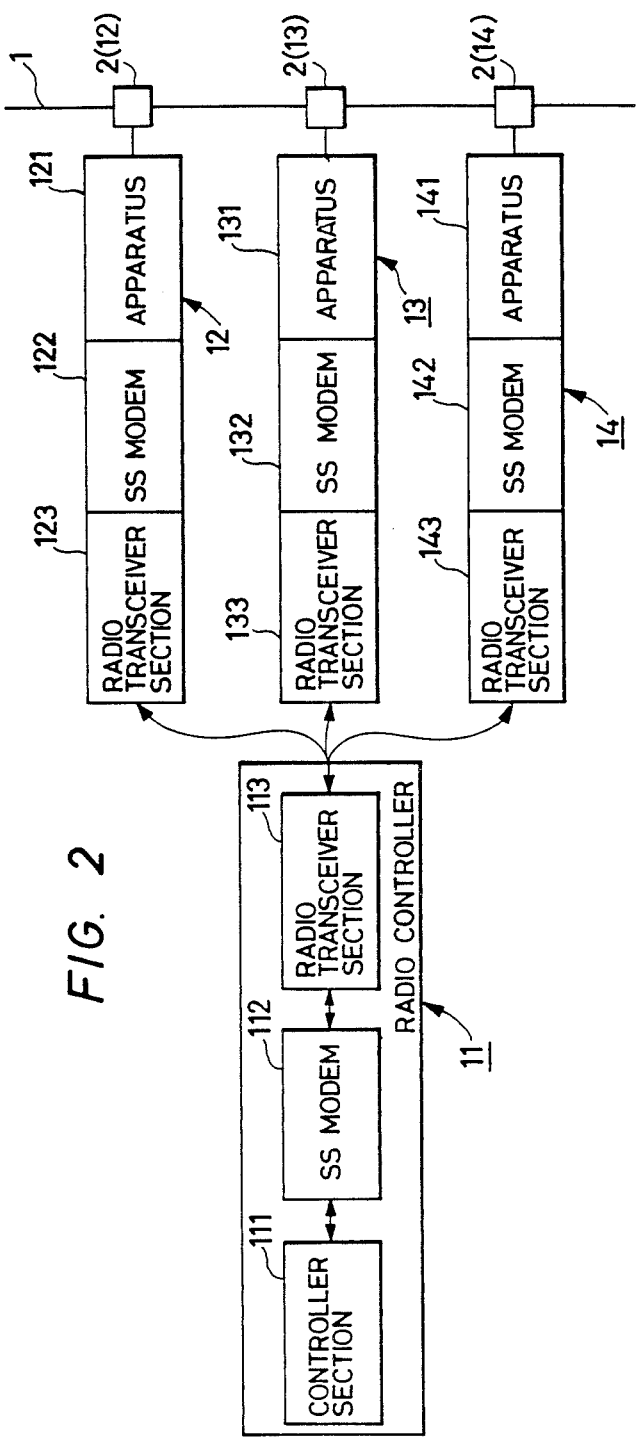
FIG. 2 is a system diagram of an embodiment of the present invention.

The embodiments of the present invention will be described in detail with reference to the drawings. Referring to FIG. 2, there is shown a radio bus system in accordance with the present invention comprising a controller (hereinafter called "radio bus controller") and a plurality of controlled devices each having a radio transceiver section. The radio controller 11 is constituted by a controller section 111, a conventional SS modem 112 and a conventional radio transceiver section 113. The information signal of the controller section 111 and the carrier of the radio transceiver section 113 are respectively spectrum-scattered and modulated by the SS modem 112 so that the radio controller 11 can radiate them together as an electric wave.

The apparatus of FIG. 2 also includes a plurality of controlled devices 12, 13 and 14 including the respective radio transceiver sections 123, 133 and 143 which communicate with the radio controller 11 by a radio wave which may be in the visible or electromagnetic spectrum. The demodulation signals received by the respective radio transceiver sections 123, 133 and 143 are in the form of spread spectrum modulated signals. Thus, the received signal must be reverse-spectrum-scattered by the respective SS modems 122, 132 and 142 so that the devices 121, 131 and 141 can receive the information signal of the controller section 111 outputted by the radio controller 11.

In addition, other necessary information, such as that for reporting abnormal conditions of the devices, can be transmitted from each of the devices 121, 131 and 141 to the controller section 111 of the controller 11 by transmitting a signal from the radio transceiver section of each device. Thus, the control signal transmission may be bidirectional.

The spread spectrum modulation in the radio controller 11 and in the controlled devices 12, 13 and 14 is carried out with a PN series for synchronization provided commonly to the equipment to be integrated into the system, and other PN series are individually allocated to that equipment. Accordingly, the radio controller 11 can select the desired plurality of controlled devices 12, 13, 14 or may select further controlled devices so as to control the devices 121, 131, 141, etc. by an information signal. Generally, the respective devices 121, 131, 141, etc. are of a stationary type using an AC source. For example, the devices 121, 131, 141, etc. may be respectively connected to AC outlets 2(12), 2(13), 2(14), etc. of the electrical line 1 as shown in FIG. 2 so that each of the devices is provided with an electric source. However, if desired, the radio controller 11 may be a low power consumption, small-scale and portable controller.

Figure 3:
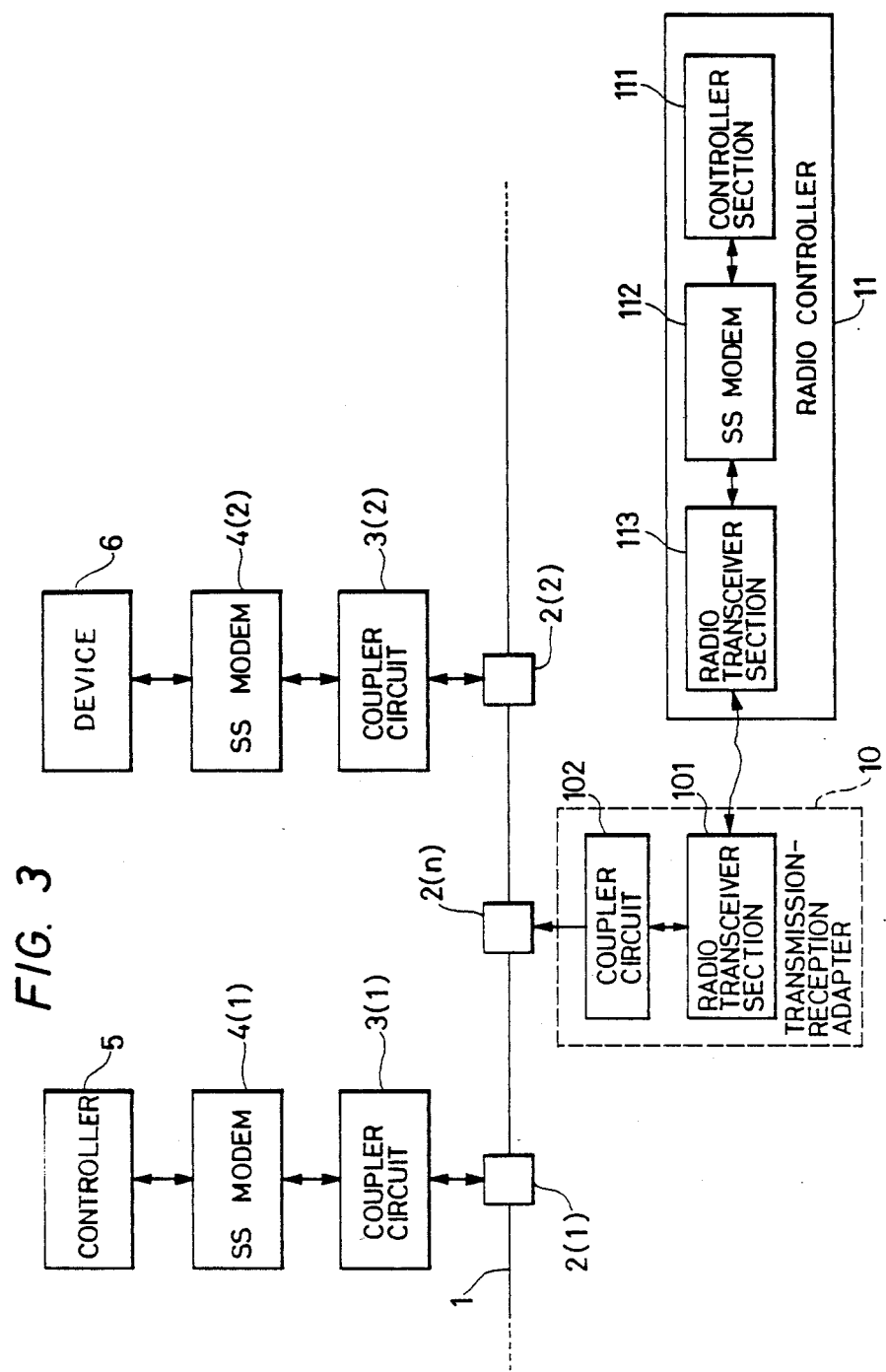
FIG. 3 is a system diagram of another embodiment of the present invention.

Next, an enlarged radio bus system formed by combining the radio bus system with spread spectrum electrical line bus system will be described with reference to FIG. 3. Referring to FIG. 3, there is shown a second embodiment of the present invention including a portion showing the connection between the radio bus system and the electrical line bus system. An SS communication controller 5 and device 6 are connected to an electrical line 1 through AC outlets 2(1), 2(2) and so forth so that an electrical line bus system may be established.

In this embodiment, a transmission-reception adapter 10 is further connected to the electrical line 1 through an AC outlet 2(n). The transmission-reception adapter 10 includes a radio transceiver section 101 and a coupler circuit 102. The radio transceiver section 101 exchanges data with the electrical line bus system through the coupler circuit 102. In addition, the radio transceiver section 101 communicates with the radio transceiver section 113 of the radio controller 11. The radio controller 11 is constructed in the same manner as described above with reference to FIG. 2 and enables bidirectional transmission between the radio controller 11 and the transmission-reception adapter 10. Radio controller 11, controller 5 and device 6 of the electrical line bus system may thus communicate bidirectionally.

In the FIG. 3 embodiment, the SS modem 12 in the radio controller 11 is of the same type as the SS modems 4(1), 4(2) and so forth contained in the electrical line bus system. Accordingly, the radio transmission line and the controller section 111 of FIG. 3 are entirely incorporated into the electrical line bus system. The SS modem 112 is synchronized with the electrical line bus system using the common synchronization PN series, and SS modem 112 performs the modulating/demodulating operation using the individually allocated PN series as part of the whole system. Thus, the signal from the radio controller 11 can be recognized by the selected device 6 or the controller 5 in the electrical line bus system. The same rule is applied to transmission in the reverse direction. Accordingly, the radio controller 11 not only can directly control the device 6 in the electrical line bus system, but radio controller 11 can indirectly control the devices which communicate over the electrical line bus system by controlling the controller 5. In addition, the radio controller 11 can receive the signal from respective devices and the controller 5 if bidirectional communication is desirable.

By combining an electric line bus system and a radio bus system as shown in FIGS. 2 and 3, the radio controller can arbitrarily control, through a radio transmission line, the devices independent of and belonging to the electrical line bus system. Accordingly, an optimum integrated system can be formed.

The radio controller 11 may also be portable so as to be carried freely for controlling the devices remotely from an arbitrary place. Also, when an electric wave is employed as a transmission means in the radio transceiver section, such controlling can be made by a weak electric wave. However, when a light wave is employed, such controlling is limited by the range and incident angle of light; however, the range and incident angle can be arbitrarily changed within the limit.

Although only a couple of exemplary embodiments of this invention have been described in detail above, those skilled in the art will readily appreciate that several modifications are possible in the preferred embodiments without materially departing from the novel teachings and advantages of this invention. Accordingly, all such modifications are intended to be included in this invention as defined by the following claims.

What is claimed is:

1. A radio bus system for transmitting signals modulated onto an electromagnetic wave to and from devices connected to an electromagnetic wave to and from devices connected to an electrical power line bus through Ac outlets, said electrical power line bus carrying information signals among said devices, comprising:
   at least one device having a transceiver section and which receives its electrical power from said electrical power line bus through at least one of said AC outlets; and
   a radio controller having a transceiver section and communicating with said at least one device, wherein said controller and said at least one device each include a spread spectrum modem which transmits an information signal between said controller and said at least one device, said information signal being converted by the modem on a transmitter side into a spread spectrum modulating signal which has the same signal format as said information signal and being carried over said electrical power line bus and then being converted into an electromagnetic wave signal in a radio transmitter part of the transceiver section on the transmitter side so as to radiate said electromagnetic wave signal, the received electromagnetic wave signal being converted into a received spread spectrum modulated signal which has the same signal format as said information signal and being carried over said electrical power line bus in a radio receiver part of the transceiver section on a receiver side and being succeedingly converted into the information signal by the modem on the receiver side.

2. A radio bus system for transmitting signals modulated onto an electromagnetic wave to and from devices connected to an electrical power line bus through AC outlets, comprising:
   at least one device which receives its electrical power from said electrical power line bus through at least one of said AC outlets;
   a radio controller having a transceiver section which communicates with said at least one device by said electromagnetic wave; and
   a transmission-reception adapter which receives its electrical power from said electrical power line bus through another one of said AC outlets and which has a radio controller and said at least one device each include a spread spectrum modem which transmits an information signal between said radio controller and said at least one device via said transmission-reception adapter, said information signal being converted by the modem in said radio controller into a spread spectrum modulating signal and then being converted into an electromagnetic wave signal in a radio transmitter part of the transceiver section of said radio controller so as to radiate said electromagnetic wave signal, the electromagnetic wave signal being received by a radio receiver part of said radio transceiver section of said transmission-reception adapter and transmitted onto said electrical power line bus through said coupler circuit and said another one of said AC outlets, the received signal on said electrical power line bus then being succeedingly converted into the information signal by the modem of said at least one device, and wherein a spread spectrum signal received from said electrical power line bus through said coupler circuit and said another one of said AC outlets is converted into an electromagnetic wave signal in a radio transmitter part of said transceiver section of said transmission-reception adapter for transmission to said radio controller so as to form an integrated transmission system in which a signal transmitted over the electrical power line bus has the same signal format as a signal transmitted between said radio controller and said transmission-reception adapter.

3. A method of transmitting signals modulated onto an electromagnetic wave, comprising the steps of:
   (1) connecting at least one device having a transceiver section to an electrical power line bus through at least one AC outlet said electrical power line bus carrying information signals among said devices;
   (2) transmitting an information signal between a radio controller having a transceiver section and said at least one device, including the steps of:
      (a) spectrum scattering said information signal with a spread spectrum modem into a spread spectrum modulating signal on a transmitter side, said spread spectrum modulating signal having the same signal format as said information signal and being carried over said electrical power line bus,
      (b) converting said spread spectrum modulating signal into an electro-magnetic wave on said transmitter side, and
      (c) radiating said electromagnetic wave signal; and
   (3) receiving said information signal transmitted between said radio controller and said at least one device, including the steps of:
      (a) receiving the transmitted electromagnetic wave signal;
      (b) converting the received electro-magnetic wave signal into a received spread spectrum modulated signal which has the same signal format as said information signal and being carried over said electrical power line bus on a receiver side, and
      (c) succeedingly converting the received spread spectrum modulated signal into the information signal with a spread spectrum modem on the receiver side.

4. A method of transmitting signals modulated onto an electromagnetic wave, comprising the steps of:
   (1) connecting at least one device having a transceiver section to an electrical power line bus through a first AC outlet;
   (2) connecting a transmission-reception adapter to said electrical power line bus through a second AC outlet;
   (3) transmitting an information signal between a radio controller having a transceiver section and said at least one device, including the steps of:
      (a) spectrum scattering said information signal with a spread spectrum modem into a spread spectrum modulating signal on a transmitter side,
      (b) converting said spread spectrum modulating signal into an electromagnetic wave on said transmitter side, and
      (c) radiating said electromagnetic wave signal; and
   (4) receiving said information signal transmitted between said radio controller and said at least one device, including the steps of:
      (a) receiving the transmitted electromagnetic wave signal with a radio receiver pat of said transmission-reception adapter, (b) transmitting the received signal onto said electrical power line bus through said second AC outlet, and
(c) succeedingly converting the signal transmitted on said electrical power line bus into the information signal with a spread spectrum modem.

5. A method as in claim 4, wherein said transmitting step (3) is also performed by said transmission-reception adapter for transmitting a status signal to said radio controller, said radio controller performing said receiving steps 4(a) and 4(c) such that two-way communication is performed.

6. A method as in claim 4, wherein the signal transmitted over the electrical power line bus has the same signal format as the signal transmitted between said radio controller and said transmission-reception adapter.

* * * * *